3,423,167
WET STATE CROSS-LINKING OF CARBOXYALKYL CELLULOSE ETHER MODIFIED REGENERATED CELLULOSE FIBERS

Joseph M. Kuzmak, Media, and Wenceslao Munoz, Trainer, Pa., assignors to FMC Corporation, Philadelphia, Pa., a corporation of Delaware
No Drawing. Filed Dec. 15, 1964, Ser. No. 418,550
U.S. Cl. 8—129
Int. Cl. D06m 1/22
7 Claims

ABSTRACT OF THE DISCLOSURE

A process for producing softer carboxyalkyl cellulose ether modified regenerated cellulose fibers having high water imbibition is disclosed herein.

---

With the object of producing regenerated cellulose fibers having increased swelling capacity on exposure to water, the fibers have been modified by injecting carboxyalkyl cellulose solutions into the cellulose solutions prior to spinning. When the modified fibers are dried they are hard and stiff and these characteristics increase with the amount of cellulose ether incorporated in the regenerated cellulose fiber.

It is a primary object of the present invention to prepare carboxyalkyl cellulose modified regenerated cellulose fibers which are softer and highly absorptive.

It is another object of the present invention to provide a process of preparing carboxyalkyl cellulose modified regenerated cellulose fibers which are processable in the same manner as ordinary rayon fibers.

These and other objects are accomplished in accordance with the present invention which is a process for producing soft, absorptive carboxyalkyl cellulose modified regenerated cellulose fibers which comprises reacting said fibers while in a wet-swollen state with a cross-linking agent, washing the fibers to remove unreacted cross-linking agent, and drying.

The carboxyalkyl cellulose ethers, which are usually incorporated in regenerated cellulose fibers by injection spinning, preferably contain from 1 to 4 carbon atoms in the alkyl group, for example, carboxymethyl cellulose, carboxyethyl cellulose, carboxymethyl - carboxyethyl cellulose, carboxypropyl cellulose and carboxybutyl cellulose. Of these, carboxymethyl cellulose is preferred.

The amount of carboxyalkyl cellulose which is incorporated in the regenerated cellulose fiber ranges from about 1 up to about 50 percent by weight and preferably from about 5 to about 20 percent.

The meaning of carboxyalkyl cellulose modified regenerated cellulose fiber in accordance with this invention is where the individual filaments of the fiber contain both carboxyalkyl cellulose ether and regenerated cellulose.

The fibers are reacted with a cross-linking agent while in a wet-swollen state i.e., the fibers are wet-crosslinked. A fiber so cross-linked will exhibit a relatively high imbibition of water and, if carried out on a fabric, the fabric will have a high wet-crease recovery but a low dry-crease recovery. Dry-crosslinking refers to cross-linking the fiber while it is dry and unswollen. Dry cross-linked fibers show both a high dry-crease recovery and a high wet-crease recovery, and imbibition is relatively low. Wet-cross-linking is critical for this invention since retention of the high imbibition (swelling) of the soft fiber is desired.

The wet-crosslinking of the mixed fiber is carried out with any known cross-linking agent and usually in the presence of an inorganic acid or base catalyst. The cross-linking reaction is continued until sufficient cross-linking occurs to provide processable or at least softer fibers. Cross-linking is discontinued by washing out the reactants before any appreciable degradation of the fiber occurs. In general, the faster the reaction the better for a commercial process. The time of the reaction will be determined by the type and amount of catalyst employed and the temperature at which the reaction is carried out. Room temperature is preferable for a commercial process as long as other conditions permit the reaction to continue at a reasonable rate.

A preferred wet-crosslinking reaction based on expense and ease of reaction is to employ formaldehyde or its equivalent, for example, sym-trioxane or paraformaldehyde, as the cross-linking agent and an acid catalyst. While formaldehyde is used in concentrations of from about 2% to about 40% it is preferably employed at a concentration of 5 to 10% based on the weight of the treating solution, to provide the desired softness to fibers having the prefered amount of carboxyalkyl cellulose incorporated therein. Where elevated temperatures are employed lesser amounts of the cross-linking agent are necessary to obtain the desired result.

Other aldehydes may be employed as the cross-linking agent, for example, acetaldehyde, paraldehyde, butyraldehyde, benzaldehyde, glutaraldehyde and furfural.

The preferred acid catalyst for the aldehydes is hydrochloric acid in an amount ranging from about 12 to 24% based on the weight of the treating solution. However, other acid catalysts may also be employed including, for example, sulfuric acid, nitric acid, phosphoric acid, oxalic acid, hydrobromic acid, phthalic anhydride, p-toluene sulfonic acid, ethyl toluene sulfonate, Lewis acids, etc.

Under the preferred cross-linking conditions and with the preferred reactants the reaction time should be less than one half hour and more than two minutes and preferably from about 3 to 15 minutes.

Any known wet-crosslinking agent will produce satisfactory results for the present invention. Other cross-linking agents include, for example, dichloropropanol, dichloromethylpropanol, dibromopropanol, divinyl sulfone, other sulfone derivatives, epichlorohydrin, butadiene dioxide, cyanuric chloride, bis(chloromethyl) sulfide, dichloroacetic acid, etc.

In most instances the above cross-linking agents are catalyzed with basic compounds including, for example, sodium hydroxide, potassium hydroxide, barium hydroxide, ammonia, magnesia, sodium carbonate, calcium carbonate, pyridine, etc. Of the above catalysts, sodium hydroxide is preferred.

Cross-linking agent and catalyst may be applied separately or in the same solution to the fiber. If applied separately either may be applied first in an amount equivalent to that required when applying as a single solution. As a practical matter the application of a single solution containing both cross-linking agent and catalyst is preferred.

The cross-linking reaction must be carried out while the fiber is in a wet-swollen condition preferably just after manufacture of the fiber and before drying. Attempts at cross-linking of the fiber in the unswollen state have produced fibers, which though soft, are low in swelling capacity.

The following examples are set forth to demonstrate the process of this invention.

EXAMPLE I

Carboxymethyl cellulose ether modified regenerated cellulose fibers were prepared using two methods. In one procedure the fiber was prepared by first dissolving 10% of carboxymethyl cellulose, based on the weight of the cellulose, in the viscose about one hour before blow down and then aging, deaerating and spinning in a conventional manner. The spin bath was composed of 7% sulfuric acid, 2% zinc sulfate and 15% of sodium sulfate.

In the second method, 7.5% of carboxymethyl cellulose dissolved in a 6% sodium hydroxide solution was injected into the viscose stream as it traveled to the jet. The viscose-carboxymethyl cellulose mixture was spun in an acid bath as in the first method.

These fibers, while still in the wet-swollen state were impregnated with an aqueous reaction solution containing 7.4% by weight of formaldehyde and 19% by weight of hydrochloric acid. The reaction was allowed to proceed for five minutes at room temperature. The fibers were then washed thoroughly to remove the reaction solution. The fibers dried to a soft, nonboardy state and were readily processable as ordinary rayon. They had an excellent swelling capacity on wetting.

EXAMPLE II

Fibers as prepared in accordance with Example I, while still in the wet swollen condition were impregnated with a 10% by weight aqueous solution of dichloropropanol. The fibers were centrifuged to remove excess solution and then immersed in a 3½% sodium hydroxide solution at 90° C. for five minutes. The fibers were thoroughly washed with water and dried. The dried fibers were soft and nonboardy. On wetting, the fibers demonstrated an excellent swelling capacity.

In each of the above examples the control fibers which where not cross-linked but dried from the wet-swollen state were stiff fibers not capable of being processed as conventional rayon yarn.

Various changes and modifications may be made practicing the invention without departing from the spirit and scope thereof and, therefore, the invention is not to be limited except as defined in the appended claims.

We claim:
1. A process for preparing softer carboxyalkyl cellulose modified regenerated cellulose fibers wherein the alkyl group of the carboxyalkyl cellulose contains from 1 to 4 carbon atoms an the carboxyalkyl cellulose is present in the modified fiber in an amount of from 1 to 50%, based on the weight of the fiber, which comprises reacting said fibers while in a wet-swollen condition with a cross-linking agent in an amount sufficient to produce soft, processable fibers, washing the fibers to remove unreacted cross-linking agent and drying.

2. The process of claim 1 wherein the modified fibers contain from about 5 to about 20%, based on the weight of the fibers, of the carboxyalkyl cellulose.

3. The process of claim 2 wherein the carboxyalkyl cellulose has from 1 to 4 carbon atoms in the alkyl group.

4. The process of claim 3 wherein the cross-linking agent is an aldehyde.

5. The process of claim 4 wherein the aldehyde is formaldehyde.

6. A process for preparing softer carboxyalkyl cellulose modified regenerated cellulose fibers wherein the alkyl group of the carboxyalkyl cellulose contains from 1 to 4 carbon atoms and the carboxyalkyl cellulose is present in the modified fiber in an amount of from about 5 to about 20% based on the weight of the fiber which comprises reacting said fibers in a wet-swollen condition with an aqueous solution of from about 2 to about 40% formaldehyde and an acid catalyst at room temperature for at least about two minutes to less than one-half hour, washing the fibers to remove unreacted cross-linking agent and catalyst, and drying.

7. The process of claim 6 wherein the catalyst is hydrochloric acid present in an amount of from 12 to 24% based on the weight of the treating solution.

References Cited

UNITED STATES PATENTS

| | | |
|---|---|---|
| 2,724,633 | 11/1955 | Daul et al. _____ 8—129 XR |
| 2,796,656 | 6/1957 | Schappel et al. ____ 8—116.3 XR |
| 2,902,391 | 9/1959 | Daul et al. _____ 8—116.3 XR |
| 2,971,815 | 2/1961 | Bullock et al. _____ 8—129 XR |
| 3,038,777 | 6/1962 | Daul et al. _____ 8—116.3 XR |
| 3,293,071 | 12/1966 | Peloquin et al. _____ 8—120 XR |

FOREIGN PATENTS

| | | |
|---|---|---|
| 335,605 | 9/1930 | Great Britain. |
| 523,566 | 7/1940 | Great Britain. |
| 980,980 | 1/1965 | Great Britain. |
| 39,947 | 2/1964 | Japan. |

OTHER REFERENCES

Bullock et al., Textile Research Journal, September 1964, pp. 741–746.

Reeves et al., Textile Research Journal, March 1960, pp. 179–192.

NORMAN G. TORCHIN, *Primary Examiner.*

J. CANNON, *Assistant Examiner.*

U.S. Cl. X.R.

264—190, 191, 195